United States Patent

Ryoo

[11] Patent Number: 5,990,957
[45] Date of Patent: Nov. 23, 1999

[54] VIDEO SIGNAL BIT AMOUNT CONTROL USING ADAPTIVE QUANTIZATION

[75] Inventor: Sung-gul Ryoo, Suwon, Rep. of Korea

[73] Assignee: Samsung Electronics Co., Ltd., Suwon, Rep. of Korea

[21] Appl. No.: 08/964,015

[22] Filed: Nov. 4, 1997

[30] Foreign Application Priority Data

Sep. 9, 1996 [KR] Rep. of Korea ............. 96-53080

[51] Int. Cl.⁶ .................................................. H04N 7/24
[52] U.S. Cl. .................................................. 348/405
[58] Field of Search .................................... 348/384, 405, 348/419; 382/251; 341/200

[56] References Cited

U.S. PATENT DOCUMENTS

| | | | |
|---|---|---|---|
| 5,079,621 | 1/1992 | Daly | 348/396 |
| 5,231,484 | 7/1993 | Gonzales | 348/405 |
| 5,299,019 | 3/1994 | Pack | 348/405 |
| 5,463,702 | 10/1995 | Trueblood | 348/391 |
| 5,598,213 | 1/1997 | Chung | 348/405 |

*Primary Examiner*—Bryan Tung
*Attorney, Agent, or Firm*—Burns, Doane, Swecker & Mathis, L.L.P.

[57] ABSTRACT

In an apparatus for controlling the bit amount of each video object plane (VOP) of a moving picture, the quantization step size for each VOP is determined based on significance, complexity and color sensitivity of each VOP, so that human visual sensitivity is taken into consideration. Picture quality of a specific VOP is input via an input unit. Visual sensitivity class is classified based on the complexity and color sensitivity of the VOP. Histogram is calculated based on the variance of video signal of the VOP and visual sensitivity values for each VOP. Then, the quantization step size for the VOP is adjusted based on the histogram and a bit model while total bit amount of a frame is maintained.

3 Claims, 4 Drawing Sheets

VIDEO SIGNAL BIT AMOUNT CONTROL USING ADAPTIVE QUANTIZATION

BACKGROUND OF THE INVENTION

1. Field of the Invention

The present invention relates to a video coding, and more particularly, to an apparatus for controlling a compression rate in a video coding, and a method therefor.

2. Description of the Related Art

In general, since video data having multi-dimensional characteristics has an information quantity larger than that of other data, the data quantity becomes huge when the multi-dimensional video data is processed digitally. Thus, in order to transmit and store the digitally processed video data, it is necessary to compress the data in consideration of the bandwidths of a communication channel required for transmission and the capacity of a storage medium required for storing information.

Standardization for moving picture video compression has been carried out by the Moving Picture Expert Group (MPEG) of JTC1/SC.29 which is a sub-committee of the International Organization for Standardization and the International Electrotechnical Commission (ISO-IEC). Particularly, standardization of MPEG-1 and MPEG-2 had been already completed and they are currently in use. Meanwhile, the International Telecommunications Union—Terminal Section (ITU-T) has made efforts to prepare video coding standards based on an Asynchronous Transfer Mode (ATM) protocol for video transmission in future broadband integrated services digital networks (B-ISDN) and has recently recommended several H.26x standards.

In a conventional coding scheme such as the MPEG-2, Differential Pulse Code Modulation (DPCM) or Discrete Cosine Transform (DCT) for reducing signal redundancy is used as a preliminary step for an effective coding. However, since a substantial compression of a signal actually occurs in the final quantization stage, the coding compression efficiency considerably depends upon the determination of a quantization step size rather than the DPCM or DCT.

To control a compression rate, the quantization step size in MPEG-2 is determined by activity calculation and buffer control. However, according to this method, picture quality may change depending on the position on a screen when a picture has both a complexity portion and an even portion in a frame. Also, since determination of the quantization step size by activities is processed based upon the luminance block having the minimum activity among four luminance blocks in a macroblock, the quantization step size suitable for human visual sensitivity is not determined due to incorrect discrimination of the even portion, edge portion and complex portion. Further, each of video objects constituting a picture is not taken into consideration individually, since the image signal is processed in the unit of frames.

In H.263, the same quantization step size is applied to whole frame, and the quantization step of the next frame is determined depending on the bit amounts of the previous frame. This method can be implemented in a simpler structure than MPEG-2. However, visual sensitivity is not still taken into consideration.

If the quantization step is determined without consideration of the visual sensitivity, the same quantization step size is applied to both more significant video objects such as human figure in a transmitted picture and less significant video objects such as background. Thus, signal compression effect may be outstanding, which greatly lowers picture quality. This is a severe problem in a low bit rate coding, particularly in the H.263 standard concerning video coding for low bit rate communications or MPEG-4 standards concerning very low bit rate video coding for mobile communications.

Therefore, to maximize the signal compression effect while minimizing deterioration in picture quality, it is necessary to determine the quantization step size depending on significance of several video objects constituting a frame in consideration of human visual characteristics and allocate appropriate bit amount to each video object.

SUMMARY OF THE INVENTION

To solve the above problems, it is an object of the present invention to provide an apparatus for controlling the bit amount of each video object plane (VOP) in encoding video signal, which determines quantization step sizes for the VOPs based on significance, complexity and color sensitivity of each VOP contained in a transmitted picture and adjusting bit amount of each VOP, so that human visual sensitivity is taken into account.

It is another object of the present invention to provide a method for controlling the bit amount of each video object plane (VOP) in encoding video signal, in which quantization step sizes for the VOPs are determined based on significance, complexity and color sensitivity of each VOP contained in a transmitted picture and bit amount of each VOP is adjusted, so that human visual sensitivity is taken into account.

To accomplish one of the above objects, there is provided a bit amount controlling apparatus for generating a quantization step size for each macroblock in a picture, comprising: an input unit for inputting a command for controlling the picture quality of a specific VOP to an arbitrary step: a visual sensitivity classifier for classifying the visual sensitivity of each macroblock in a VOP to be encoded in consideration of the complexity and color sensitivity of the macroblock; a variance classifier for classifying the variance of each block in the VOP for predicting a bit amount of the picture; a histogram calculator for calculating a histogram based on the variance and visual sensitivity classes of each block to predict a bit amount for an arbitrary quantization step size; a bit modeling unit for calculating and storing a bit model which indicates average bit amounts according to block variances and quantization step sizes; a quantization step size reference unit for storing the quantization step sizes having a constant deterioration degree in the visual sensitivity for each class classified by the visual sensitivity classifier; a target bit calculator for calculating target bits for each VOP; a bit amount calculator for calculating the bit amount estimated by the bit model, the histogram obtained by the histogram calculator and the reference quantization step size stored in the quantization step size reference unit; a target bit allocation unit for varying the predictive bit amount calculated by the bit amount calculator by the value output by a reference quantization step size controller, and compensating difference between the predictive bit amount and the target bits calculated by the target bit calculator; and the reference quantization step size controller for generating the reference quantization step size, to keep the target bits of the entire frame while varying bit allocation to a specific VOP, set by the picture quality input unit at a desired ratio, in allocating target bits for each VOP in the target bit allocation unit.

To accomplish another one of the above objects, there is provided a bit amount controlling method for generating a quantization step size for each macroblock in a picture, comprising the steps of inputting a command for controlling the picture quality of a specific VOP to an arbitrary step; classifying the visual sensitivity of each macroblock in a VOP to be encoded in consideration of the complexity and color sensitivity of the macroblock; classifying the variance of each block in the VOP for predicting a bit amount of the picture; calculating a histogram based on the variance and visual sensitivity classes of each block to predict a bit amount for an arbitrary quantization step size: calculating and storing a bit model which indicates average bit amounts according to block variances and quantization step sizes; providing the quantization step sizes having a constant deterioration degree in the visual sensitivity for each class; calculating target bits for each VOP; calculating the bit amount estimated by the bit model, the histogram and the quantization step size; varying the bit amount by the value output from the quantization step size reference unit and compensating difference between the bit amount and the target bits; and keeping the target bits of the entire frame while varying bit allocation to a specific desired VOP, according to the input command.

According to the present invention, a given compression rate for entire VOPs is kept constant while adjusting picture quality by controlling compression rate for a specific object in a frame, thereby preventing deterioration in picture quality due to limited transmission channels in a moving video phone or video teleconferencing. Also, picture quality is improved at the same bit amount by controlling the quantization step size according to deterioration degree of the picture quality through picture characteristic classification, whereas the conventional bit amount controlling method in a frame unit mainly adopts variance of a picture and buffer occupancy.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

In the present invention, a video frame is partitioned into several video object planes (VOPs), and the video signal is encoded in the unit of VOPs. The specific partitioning method of the video frame is not within the scope of the present invention, and any technique which has been proposed or will be proposed in the future may be employed in the present invention.

Figure 5A:
FIG. 5A shows a test video sequence for explaining the concept of video coding for each VOP.
Figure 5B:
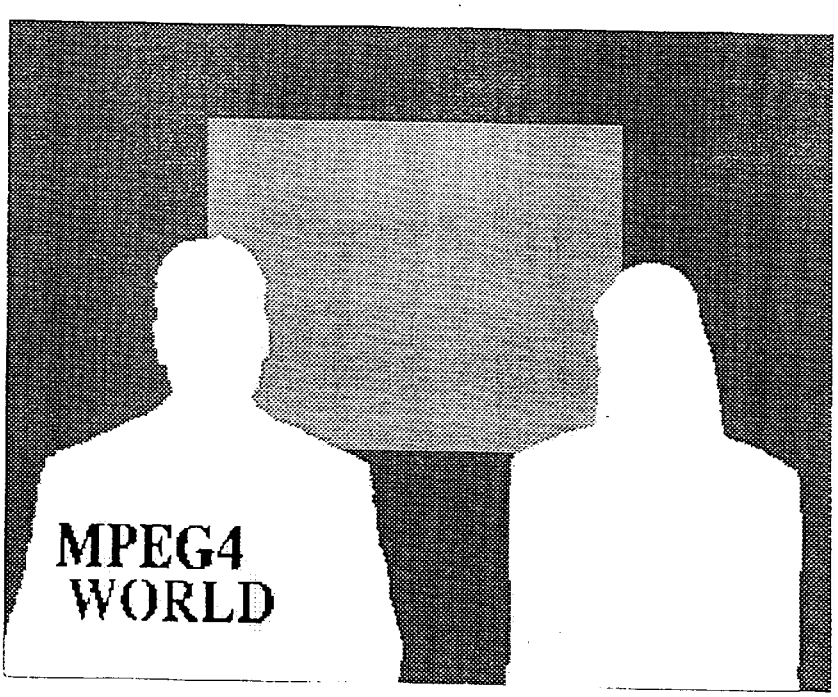
FIG. 5B shows main VOPs in the test video sequence shown in FIG. 5A.

FIG. 5A shows a test picture for explaining the concept of video coding for each VOP. The picture is referred to as a "news picture" of a common intermediate format (CIF) of 352 horizontal pixels and 288 vertical pixels and having a duration of 300 frames or 10 seconds. This picture can be partitioned into four VOPs in a frame as shown in FIG. 5B. To be more detail, VOP 0 represents a background, VOP 1 represents a girl is dancing in a middle portion of the background, VOP 2 represents a male and female announcers, and VOP 3 represents a character of "MPEG-4 World."

Figure 1:
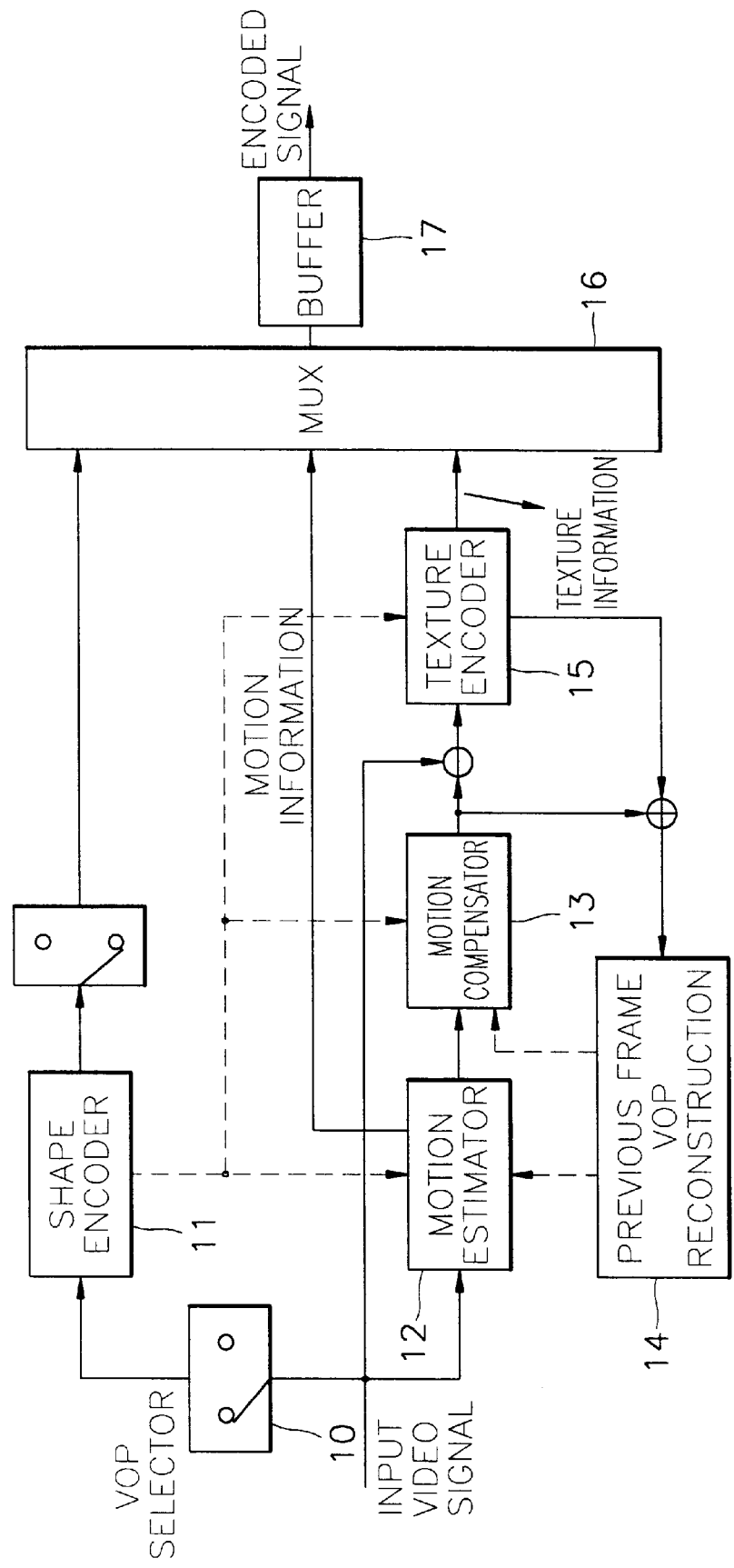
FIG. 1 is a conceptual diagram of general video coding for each VOP.

FIG. 1 illustrates conceptually a general video encoding performed in the unit of VOPs.

Input video information is sequentially selected in the unit of VOPs by a VOP selector 10. A shape encoder 11 extracts shape information corresponding to contour for the selected VOP and encodes such information and outputs the result. A motion estimator 12 subtracts an input video signal from a previous reconstructed VOP output form a previous frame VOP reconstruction portion 14 to output a differential video signal. A motion compensator 13 defines characteristic values for frequency components of the information output from the motion estimator 12. A texture encoder 15 encodes a signal output from the motion compensator 13 to output texture information. A multiplexer 16 receives shape information, motion information and texture information, respectively output from the shape encoder 11, motion estimation portion 12 and texture encoder 15, and multiplexes the received information. A buffer 17 receives the multiplexed video input from the multiplexer 16, and temporarily stores and output the same.

The present invention controls the overall bit amounts by allocating an appropriate quantization step size to texture information in a video processing method for VOPs shown in FIG. 1.

Figure 2:
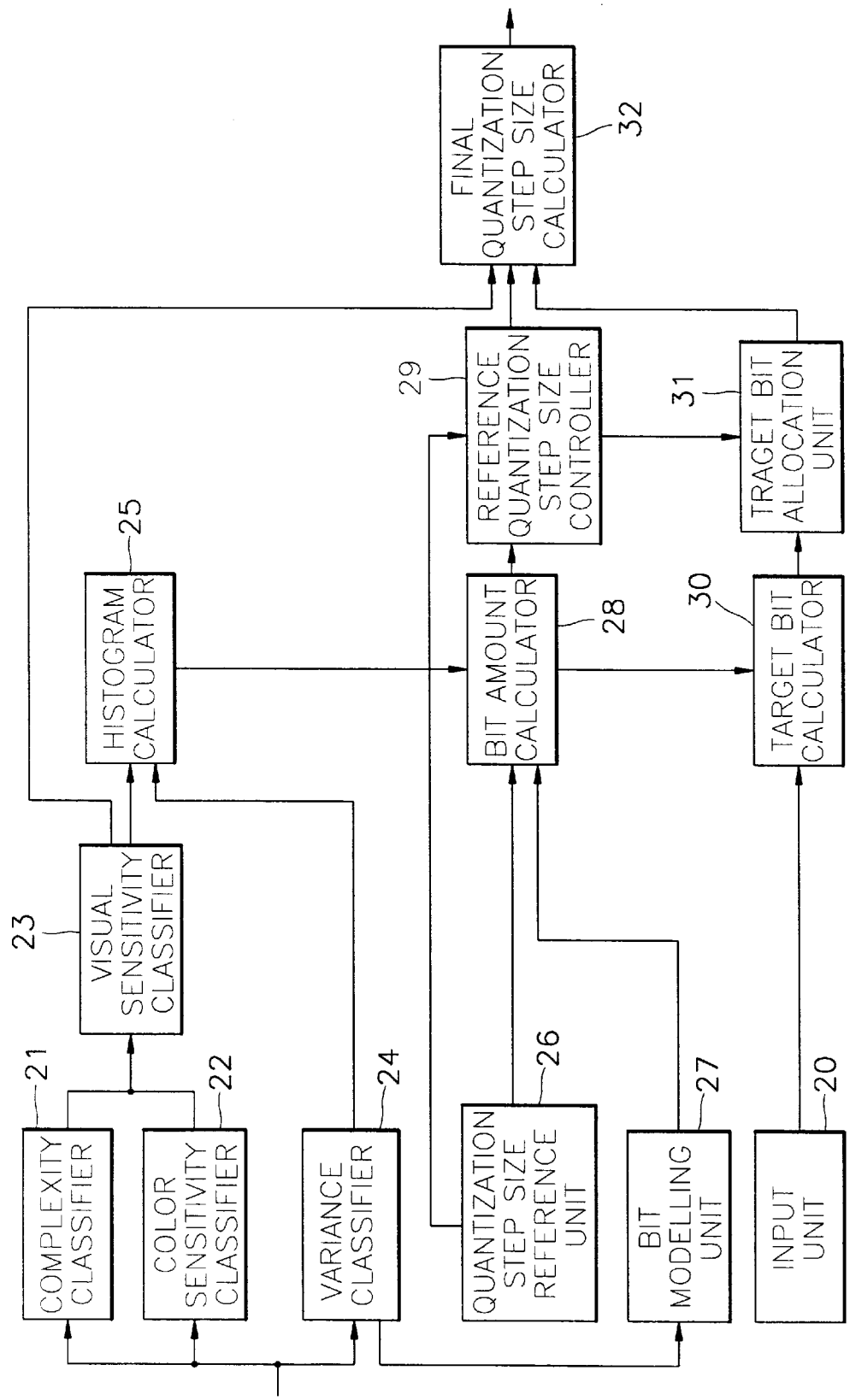
FIG. 2 is a block diagram of a video coder according to the present invention.

FIG. 2 is a block diagram of a video encoder according to the present invention, which includes an input unit 20, a complexity classifier 21, a color sensitivity classifier 22, a visual sensitivity classifier 23, a variance classifier 24, a histogram calculator 25, a quantization step size reference unit 26, a bit modeling unit 27, a bit amount calculator 28, a reference quantization step size controller 29, a target bit calculator 30, a target bit allocation unit 31, and a final quantization step size controller 32.

The input unit 20 is a command input device for controlling the picture quality of a specific VOP to an arbitrary level.

The complexity classifier 21 classifies the complexity of the image of each macroblock positioned in a VOP to be encoded.

The color sensitivity classifier 22 classifies the color sensitivity of each macroblock positioned in a VOP to be encoded.

The visual sensitivity classifier 23 classifies the visual sensitivity in consideration of the complexity and color sensitivity values of the macroblock which are output by the complexity classifier 21 and the color sensitivity classifier 22, respectively.

The variance classifier 24 calculates and classifies the variance of image for each block to predict the bit amount of the encoded video signal for each macroblock positioned in the VOP to be encoded.

The histogram calculator 25 calculates a histogram based on the classified variance and visual sensitivity values for each block, to be used for predicting bit amounts for an arbitrary quantization step size.

The quantization step size reference unit 26 stores the quantization step sizes having a constant deterioration degree in the visual sensitivity for each class classified by the visual sensitivity classifier 23.

The bit modeling unit 27 calculates and stores bit models for estimating the bit amount formed in a quantizer matrix used in the coder.

The bit amount calculator 28 calculates the bit amount estimated by the bit model, the histogram obtained by the histogram calculator 25, and the reference quantization step size stored in the quantization step size reference unit 26.

The reference quantization step size controller 29 adjusts and outputs the reference quantization step size to keep the target bit amount of the entire frame while varying bit amounts allocated to each VOP according to the desired ratio input via the input unit 20, in allocating target bits for each VOP in the target bit allocation unit 31.

The target bit calculator 30 calculates target bit amount for each VOP.

The target bit allocation unit 31 varies the predictive bit amount calculated by the bit amount calculator 28 by the value output by the reference quantization step size controller 29, and compensates difference between the predictive bit amount and the target bits calculated by the target bit calculator 30.

The final quantization step size controller 32 controls the final quantization step size, in consideration of the reference quantization step size, the visual sensitivity class for each macroblock, the variance class for each block, and the buffer occupancy to adapt the bit amount of each macroblock to the target bits.

The apparatus of the present invention having the aforementioned configuration operates as follows.

When a user inputs an arbitrary VOP number or clicks specific portion of a frame by use of a mouse, the relevant VOP is selected and then the picture quality of the VOP can be relatively controlled. Next, the picture quality level of the relevant VOP or the relative increas/decrease ratio thereof is input using input device such as a keyboard or mouse.

Meanwhile, in another embodiment of the present invention, the VOP and the picture quality level may be selected concurrently without selecting the VOP and the picture quality level separately in such a manner that the user inputs "VOP 1, to the best picture quality."

The input VOP number and the picture quality level are output to the target bit calculator 30.

The complexity classifier 21, which is employed for fully reflecting the human visual characteristics, calculates texture masking obtained by combining spatial frequency and color tolerance for each macroblock in the VOP and classifies the complexity of the macroblock. The texture masking is calculated by adding and horizontal and vertical spatial frequencies of the macroblock considering a threshold value (th) obtained by a color tolerance look up table, as expressed in the following equation (1):

$$\text{texture masking} = H_n + V_n \quad (1)$$

$$= \sum_{y=1}^{16} \sum_{x=1}^{16} (|P_{x,y} - P_{x-1,y}| > th) +$$

$$\sum_{y=1}^{16} \sum_{x=1}^{16} (|P_{x,y} - P_{x-1,y}| > th)$$

In other words, the texture masking is separately calculated horizontally and vertically to then be added. Here, a luminance difference is reflected on calculation of the spatial frequency only when the luminance difference between adjacent pixels is greater than the threshold value so that the change in the luminance differences is discernible. When the luminance difference between adjacent pixels is less than the threshold value, the luminance difference is not reflected thereon.

Figure 3A:
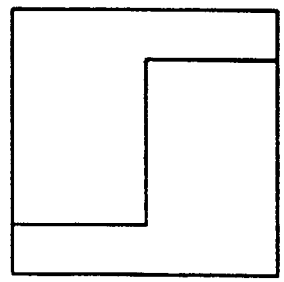
FIGS. 3A and 3B illustrate complexity of a macroblock.
Figure 3B:
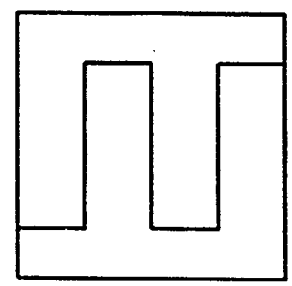

A complex image can be definitely discriminated from a simpler image by using the texture masking expressed by the equation (1). For example, FIGS. 3A and 3B illustrate two macroblocks having different complexities. Although the complexities of two macroblocks shown in FIGS. 3A and 3B are not discriminated by using only the variance to be described later, but can be definitely discriminated by using the texture masking. Thus, the complexity of an image can be calculated to be approximate to human visual sensitivity. Also, instead of simply taking the luminance difference between adjacent pixels into consideration, the luminance difference between adjacent pixels is reflected into the texture masking of the present invention only when the luminance difference between adjacent pixels is greater than the threshold value, which allows the human visual sensitivity for the video signal in the macroblock to be fully considered.

Based on the calculated texture masking, the complexity classifier 21 classifies the complexity of the macroblock into one of four complexity classes.

The color sensitivity classifier 22 divides a 16×16 macroblock into four 8×8 blocks and obtains a mean color for the each of the blocks. The color sensitivity classifier 22 calculates the color sensitivity value for each of the macroblocks by referring to a chrominance look up table. In the present embodiment, the color sensitivity classes are eight. The color sensitivity class of the macroblock is determined as the smallest one among the color sensitivity values of the four macroblocks as follows.

$$\text{color class} = \min_{sblk=1,4} (\text{color}_{sblk})$$

$$\text{color}_{sblk} = f(C_{mean})$$

$$C_{mean} = \frac{1}{64} \sum_{y=1}^{\theta} \sum_{x=1}^{\theta} (C_{x,y})$$

The visual sensitivity classifier 23 classifies visual sensitivity of a macroblock by the combination of the complexity class and the color sensitivity class from the complexity classifier 21 and the color sensitivity classifier 22, respectively.

In the present embodiment, the visual sensitivity is uniformly classified into 32 (8×4) classes in total according to the complexity class and the color sensitivity class values. However, in another embodiment of the present invention, the visual sensitivity may be classified ununiformly into 32 classes by classifying the color sensitivity classes into 4, utilizing the fact that the complexity class frequently occur in the second or third class in view of general characteristic of a picture, and then by nonuniformly classifying the complexity sections according to the values.

The variance classifier 24 calculates and classifies the variance of a macroblock. The variance is used for predicting the bit amount of the macroblock in the case of quantizing the video signal into a specific quantization step size.

Figure 4:
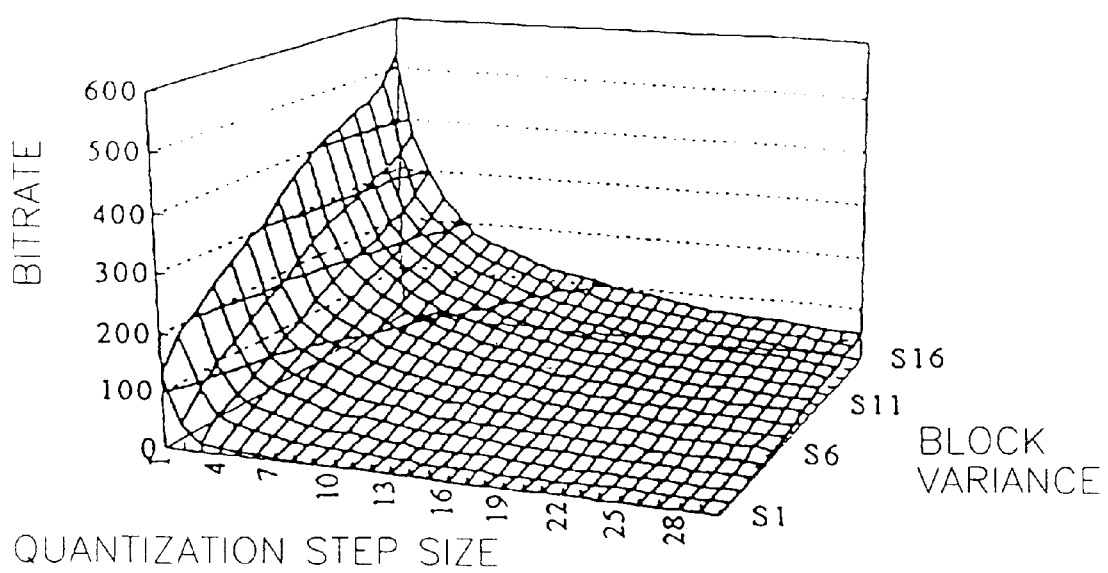
FIG. 4 is a graph showing the relationship between quantization step size, variance and bit amount.

FIG. 4 is a graph showing the relationship between quantization step size, variance and bit amount. As shown in FIG. 4, the bit amount is proportional to the variance of the video signal when the equal quantization step size is maintained constant. Also, the bit amount of the video signal having the same variance is inversely proportional to the quantization step size. Therefore, once the quantization step size and the variance of the video signal is known, the bit amount can be estimated to an accuracy of about 90%.

However, it is not easy to estimate the bit amount by use of a simple equation since the relationship between quantization step size, variance and bit amount is not constant but varies depending on characteristics of the signal. Therefore, in order to estimate the bit amount by extracting statistical characteristics, in the present invention, the variance of a block is obtained by the following equation (2) and classified into one of 16 classes, and then a statistical mean value for various video signals being under experiment is obtained to induce the relationship between quantization step size, variance and bit rate.

$$\text{Variance} = \frac{\sum x^2 - (\sum x)^2}{64} \qquad (2)$$

To estimate the bit rate exactly, the class of the block variance must be determined appropriately. In this embodiment, the class of the block variance is made sufficiently small, and the block occurrence, block variance, quantization step size and bit rate of each section of the video signal being under experiment are searched, thereby determining 17 classes. The 17 classes are composed of 16 classes having the same average estimation probable error and a class for skipped block during actual video compression, in consideration of the bit rate and block occurrence of each block. Here, the skipped block means a block in which frame video information is not transmitted but it is indicated that the current frame is the same as the previous frame.

The complexity classes, for reflecting human visual characteristics, are obtained for a source video signal, irrespective of intraframe coding or interframe coding. However, the block variance classes for predicting the bit rate of a video signal to be quantized, is obtained for a source video signal in the case of the intraframe coding, and for a differential video signal on which DPCM (differential pulse code modulation) is performed, in the case of the interframe coding. Therefore, depending whether the coding is intraframe coding or interframe coding, separate classes are necessary. Table 1 indicates block variance classes.

TABLE 1

| Variance class | Intraframe coding | Interframe coding |
|---|---|---|
| 0 | ~16 | ~8 |
| 1 | ~32 | ~16 |
| 2 | ~64 | ~32 |
| 3 | ~128 | ~48 |
| 4 | ~256 | ~64 |
| 5 | ~384 | ~96 |
| 6 | ~512 | ~128 |
| 7 | ~768 | ~160 |
| 8 | ~1024 | ~192 |
| 9 | ~1280 | ~256 |
| 10 | ~1792 | ~320 |
| 11 | ~2048 | ~448 |
| 12 | ~3072 | ~640 |
| 13 | ~4096 | ~896 |
| 14 | ~6154 | ~1536 |
| 15 | ~∞ | ~∞ |
| 16 | Skipped block | Skipped block |

The histogram calculator 25 calculates cumulative block occurrence (histogram) of the frame currently being processed, based on the classification result of the visual sensitivity classifier 23 and that of the block variance. The bit rate of the frame or VOP can be estimated by the histogram, and the estimated value and target value can be adjusted.

Since the video signal has a high correlativity between frames, the calculation result of the previous frame can be used in calculating the histogram, instead of obtaining the histogram for the current frame or VOP video signal to be encoded. Therefore, a separate temporal delay for calculation of the histogram is not necessary, thereby allowing real time processing.

For all cases of 32×17 classes in total, the calculation result of the histogram is defined as H[Mc][Bv]. For example, H[2][3] represents that the frame or VOP occurrence of the macroblock whose visual sensitivity class is 2 and whose variance class is 3. In a preferred embodiment of the present invention, the histogram is obtained as follows:

for (i = 0; i < VOPcount, i++)

{

$M_c$ = hvs_class[i]

for (n = 0; n < 6; n++)

{

$B_v$ = variance_class [i][n];

H[$M_c$][$B_u$]++;

}

}

Here, hvs_class represents the visual sensitivity class, variance_class represents the variance class, VOPcount represents the number of macroblocks included in a VOP or frame, and H represents the histogram.

The distribution of the video signal in the VOP or frame can be known by the histogram. Also, the histogram is used for estimating the bit rate in the case of adopting the reference quantization step size and for controlling the quantization step size to be suitable for the target bit rate.

Generally, the bit rates for a video, even quantized with the same quantization step size, vary considerably depending on the characteristics of the video signal. Therefore, to approximate the bit rate to a given target bit rate, the quantization step size must be adjusted. At this time, in order to determine the adjustable range of the quantization step size, we must know the bit rate when quantizing a video with an arbitrary quantization step size. To this end, if quantization is performed with a specific value and then the adjustable range of the quantization is to be determined according to the bit rate by trial and error, the system complexity increases and real time processing is hindered. To solve the problem, a table for predicting the bit rates, i.e., bit model, is created to be adopted in the present invention.

The bit model means an estimated bit rate for an arbitrary block in the case of quantizing the block with each quantization step size, ranging from 1 to 31, and is used for predicting the bit rate for adjusting the reference quantization step size to be described later and adaptively allocating the target bits in the unit of macroblocks. The bit model is derived from the relationship between the quantization step size, variance and target bits, and is obtained by calculating the mean value of the bit rates of blocks in the case of quantizing the blocks with the respective quantization step sizes in the 16 variance classes (except one skipped block among 17 classes) of the blocks. The bit model which is a fixed value is not necessarily obtained. The bit model suitable to a quantizer matrix adopted in the coding procedure can be used.

The quantization step size reference unit 26 stores the information on the quantization step size having the constant deterioration degree in visual sensitivity for each class obtained by the visual sensitivity classifier 23.

The video classified by the visual sensitivity classifier 23 has different deterioration characteristics for the quantization step size for each class. Therefore, experiments are performed on the deterioration degree in the picture quality, depending on the quantization step size, for various test video sequences, thereby obtaining the quantization step size for each class having the same deterioration degree. The deterioration degree in picture quality may be different even for classes having the same visual sensitivity class, and the average is obtained for various video sequences. These values are used as the reference quantization step size and used for predicting the bit rate for each VOP.

For all macroblocks in a VOP, the bit rate can be predicted based on the values obtained by the visual sensitivity classifier 23 and the histogram portion 25. According to experiments, the prediction is made with an accuracy of over 90%. The bit amount calculator 28 calculates the estimated VOP bit rate using the bit model and histogram as follows:

$$\text{Estimated VOP bitrate} = \sum_{Mc=0}^{32} \sum_{Bv=0}^{16} B[Rq[Mc]][Bv] * H[Mc][Bv] \quad (3)$$

where B represents the bit model, Rq represents the quantization step size, H represents the histogram, Mc represents the visual sensitivity class, and Bv represents the variance class. If the variance class Bv is 16, the block is skipped so that no texture bit is generated.

The value obtained from the equation (3) given above is just an estimated value of the texture bit. In MPEG-1 or MPEG-2, since the processing is generally performed in the unit of frames, the bit rate is mostly composed of texture bit and motion bit values. However, if the processing must be performed in the unit of objects, like in MPEG-4, shape bits for expressing the objects are additionally necessary. Therefore, controlling the bit rate is allowed by mainly using the quantization step size of the texture bit, and the motion bit and shape bit are also taken into consideration. By adding the motion bit and shape bit to the texture bit, the entire bit rate for a VOP is given by the equation (4):

entire VOP bit amount=estimated VOP bit amount+motion bits+ shape bits (4)

The estimated VOP bit rate obtained from the equation (3) is first obtained by the reference quantization step size, by which the target bits of various VOPs in the frame can be adjusted. In other words, first, the bit rates for the respective VOPs are estimated by the reference quantization step size, thereby calculating the ratio of the bit rates so that all VOPs have the similar picture quality level. Thus, the calculated value is used for allocating the target bits for each VOP. In estimating the next bit rate, it is necessary to adjust the reference quantization step size to be suitable for each VOP for adjusting the target bits for each VOP, to be described later. Determination of the adjustment amount is made by predicting the quantization step size for approximating to the target bits.

The target bit calculator 30 calculates the target bits for the respective VOPs. A picture is divided into an intraframe picture and an interframe picture, each of which has different bit rates from each other even coding the same at the same quantization step size. Therefore, the target bits per frame can be basically allocated according to the target bit rate, and the number and type of the frame to be processed. The target bits per frame is varied by the bit quantity used for frames having been transmitted up to now among several frames decided for a transmission unit, that is, the rest bit quantity. Also, the target bit rate for each VOP is determined by the histogram and the number of macroblocks included in each VOP. However, each determined target bit rate is readjusted according to a specific VOP number input from the input unit 20 and a desired weighted rate. Accordingly, the desired target bit rate for each VOP is dynamically allocated as follows:

$buf\_rest = B - buff;$ $if (Intraframe) \; targetbit = 5 \; * \dfrac{buf\_rest}{frames\_rest};$ $else \; if \; (Interframe)$ $\{$ $\quad targetbit = \dfrac{buf\_rest}{frames\_rest};$ $\quad if \; (previous\_frame\_bit < average\_frame\_bit * 1.15);$ $\quad \{$ $\quad\quad targetbit \; -= targebit * 0.2;$ $\quad \}$ $\quad if \; (previous\_frame\_bit < average\_frame\_bit / 1.15);$ $\quad \{$ $\quad\quad target + \; = targetbit * 0.2$ $\quad \}$ $\}$ The reference quantization step size controller 29 adjusts the value of the reference quantization step size output from the quantization step size reference unit 26 and allocates the adjusted value to each VOP, so that the target bit rate of the entire frame is kept constant while varying bits allocated to a specific VOP, as designated by the input unit 20, in allocating target bits to each VOP by the target bit allocation unit 31.

To this end, first, a predetermined value is added or subtracted to or from the reference quantization step size while repeatedly estimating the bit rate using the histogram obtained in the relevant VOP of the previous frame, thereby obtaining the quantization step size which approximates most to the target bits. Then, the value added to or subtracted from the reference quantization step size is obtained. Next, the adjustable value as obtained above is added to 32 reference quantization step sizes to then obtain the difference from the result value and the quantization step size applied to the relevant VOP of the previous frame. If the obtained difference exceeds 10% the quantization step size applied to the relevant VOP of the previous frame, 10% is added or subtracted to or from the quantization step size applied to the relevant VOP of the previous frame, to then apply the result to the current VOP.

The target bit allocation unit 31 compensates the difference between the target bits per frame output from the target bit calculator 30 and the bit rate output from the bit amount calculator 28, based on the adjusted reference quantization step size output from the reference quantization step size controller 29.

Also, the target bit allocation unit 31 allocates the target bits to each VOP, if the target bits per frame are determined. At this time, to differentiate the picture quality for a specific VOP, relative addition or subtraction is performed on another VOPs in target bit allocation. In other words, the target bits are incremented for important VOPs, and the incremented bits are subtracted from the important VOPs. Allocation of target bits is performed as follows:

for (i = 0; i < no_of_VOPs; i++)
{
    target VOPbits[i] = frame Texture Target bits
    $$* \frac{estimated\ VOP\ Texture\ bits[i]}{estimated\ Frame\ bits};$$
}
no_of_add_bits = targetVOPbits [selected_VOP] + add_factor targetVOPbits [selected_VOP] + = no_of_add_bits for (i = 0; i < no_of_VOPs; i++)
{
    if (i! = selected_VOP)
    target VOPbits[i] = target VOPbits[i]
    $$-no\ of\ add\ bits * \frac{target\ VOPbits[i]}{frame\ Texture\ Targetbits};$$

The quantization step size for each VOP obtained by the above-described procedure is stored to then be applied according to the visual sensitivity classes of the macroblocks in each processed VOP. The final quantization step size controller 32 adjusts the final quantization step size, in consideration of the reference quantization step size controlled for approximating the same to the target bits, the visual sensitivity class for each macroblock, the variance class for each block, and the buffer occupancy.

Table 2 summarizes the result of a simulation. In the simulation, the News CIF 300 frame video sequence shown in FIG. 5A, the VOP of which is partitioned as shown in FIG. 5B, is subsampled by 7.5 frames per second, and the entire target bit rate is 240 kbps. Also, the case of coding the entire frames at the same bit rate is compared with weighting VOP 0, VOP 1 and VOP 2, respectively, in the Table 2. In each example, the character portion was encoded at the same bit rate since the character portion exhibits little change in motion and shape, and is in the same color. As can be seen in the Table 2, the entire bit amount is kept constant even though the bit amount of respective VOP is different. In other words, the bit rate of each VOP may be varied while the total bit amount is kept almost constant.

TABLE 2

| VOP Number | Entire frames | VOP 0 weighted | VOP 1 weighted | VOP 2 weighted |
| --- | --- | --- | --- | --- |
| VOP 0 | 442,611 | 528,230 | 405,085 | 416,165 |
| VOP 1 | 780,676 | 720,830 | 992,531 | 554,913 |
| VOP 2 | 999,325 | 947,106 | 814,156 | 1,251,626 |

TABLE 2-continued

| VOP Number | Entire frames | VOP 0 weighted | VOP 1 weighted | VOP 2 weighted |
| --- | --- | --- | --- | --- |
| VOP 3 | 206,591 | 209,270 | 203,814 | 205,745 |
| Total | 2,429,203 | 2,405,436 | 2,415,586 | 2,428,444 |

As described above, the present invention allows the target bit amount to be kept constant while allowing picture quality to degrade uniformly by adopting visual sensitivity characteristics, whereas the bit amount controller of the conventional video coding apparatus mainly considers only the statistical characteristics of a picture. Particularly, when the method of the present invention is employed in a video processing method having a codec structure which enables to process specific parts of a picture to a desired picture quality, as in MPEG-4, the entire bit amount can be kept constant while the picture quality of a specific VOP designated by a user is varied. For example, in a video system having low bit rate transmission channels such as a moving video phone, it is possible that excellent picture quality is maintained in a face portion and lowered picture quality is maintained in other portions. By doing so, the user's need may be satisfied since the picture quality of the desired portion is maintained to be excellent while the entire transmission rate is kept constant under a restriction. Also, the picture quality is enhanced than the conventional methods which adopts the same quantization step size to all VOPs in a frame since a uniform picture quality is generally maintained even when the compression rate is different between each portions of a picture in view of video characteristics. Therefore, the present invention can be adopted for maintaining a desired bit rate in coding a video by MPEG-1, MPEG-2, MPEG-4 or H.263.

As described above, according to the present invention, a user can control the picture quality for a specific object, and a given entire compression rate is kept constant, thereby preventing deterioration in the entire picture quality and controlling the picture quality for specific desired parts.

Also, in the case of performing video processing is performed in the unit of VOPs as in MPEG-4, the present invention can be applied for controlling the compression rate for each object, as well as the conventional codec structure in which video processing is performed in the unit of frames as in MPEG-1, MPEG-2 or H.263. In the case of controlling the compression rate in the unit of frames, the present invention provides improved picture quality at the same compression rate since the quantization step size is adjusted through classification of picture characteristics depending on the deterioration degree of picture quality, in contrast with the conventional method in which the compression rate is mainly controlled by video variance and buffer occupancy.

What is claimed is:

1. A bit amount controlling apparatus for generating a quantization step size for each macroblock in a picture, comprising:

an input unit for inputting a command for controlling the picture quality of a specific video object plane to an arbitrary step;

a visual sensitivity classifier for classifying the visual sensitivity of each macroblock in a video object plane to be encoded in consideration of the complexity and color sensitivity of the macroblock;

a variance classifier for classifying the variance of each block in the video object plane for predicting a bit amount of the picture;

a histogram calculator for calculating a histogram based on the variance and visual sensitivity classes of each block to predict a bit amount for an arbitrary quantization step size;

a bit modeling unit for calculating and storing a bit model which indicates average bit amounts according to block variances and quantization step sizes;

a quantization step size reference unit for storing the quantization step sizes having a constant deterioration degree in the visual sensitivity for each class classified by said visual sensitivity classifier;

a target bit calculator for calculating target bits for each video object plane;

a bit amount calculator for calculating the bit amount estimated by the bit model, the histogram obtained by said histogram calculator and a reference quantization step size stored in said quantization step size reference unit;

a target bit allocation unit for varying the predictive bit amount calculated by said bit amount calculator by the value output by a reference quantization step size controller, and compensating difference between the predictive bit amount and the target bits calculated by said target bit calculator; and said reference quantization step size controller for generating the reference quantization step size, to keep the target bits of the entire frame while varying bit allocation to a specific video object plane, set by said picture quality input unit at a desired ratio, in allocating target bits for each video object plane in said target bit allocation unit.

2. The apparatus according to claim 1, wherein said visual sensitivity classifier comprises:

a complexity classifier for classifying the complexity of each macroblock in a video object plane to be encoded; and a color sensitivity classifier for classifying the color sensitivity of each macroblock in the video object plane.

3. A bit amount controlling method for generating a quantization step size for each macroblock in a picture, comprising the steps of:

inputting a command for controlling the picture quality of a specific video object plane to an arbitrary step;

classifying the visual sensitivity of each macroblock in a video object plane to be encoded in consideration of the complexity and color sensitivity of the macroblock;

classifying the variance of each block in the video object plane for predicting a bit amount of the picture;

calculating a histogram based on the variance and visual sensitivity classes of each block to predict a bit amount for an arbitrary quantization step size;

calculating and storing a bit model which indicates average bit amounts according to block variances and quantization step sizes;

providing the quantization step sizes having a constant deterioration degree in the visual sensitivity for each class;

calculating target bits for each video object plane;

calculating the bit amount estimated by the bit model, the histogram and the quantization step size;

varying the bit amount by the value output from said quantization step size reference unit and compensating difference between the bit amount and the target bits; and keeping the target bits of an entire frame while varying bit allocation to a specific desired video object plane, according to the input command.

* * * * *